2 Sheets—Sheet 1.

C. F. TUTTLE.

Hot Air Register.

No. 136.

Reissued May 1, 1849.

Inventor
Charles F. Tuttle

N. PETERS, Photo-Lithographer, Washington, D. C.

2 Sheets—Sheet 2.

C. F. TUTTLE.

Hot Air Register.

No. 136.

Reissued May 1, 1849.

Inventor
Charles F. Tuttle

N. PETERS, Photo-Lithographer, Washington, D. C.

UNITED STATES PATENT OFFICE.

CHARLES F. TUTTLE, OF WILLIAMSBURG, NEW YORK.

IMPROVEMENT IN HOT-AIR REGISTERS.

Specification forming part of Letters Patent No. 6,060, dated January 23, 1849; Reissue No. 136, dated May 1, 1849.

*To all whom it may concern:*

Be it known that I, CHARLES F. TUTTLE, of Williamsburg, county of Kings, and State of New York, have invented a new and Improved Register, used for the purpose of regulating the admission of heated air into rooms or dwellings from hot-air furnaces or other warming apparatus, or for ventilating rooms and dwellings; and I do declare the following to be a full and exact description.

The nature of my invention consists in the new and improved method adopted of opening and closing the register or ventilator by means of an upright or vertical wheel, or a segment of a wheel, which is connected with and gives motion to the valves by means of a movable connecting-rod, which is suspended on the side of the wheel on a pin projecting therefrom; and this connecting-rod is attached to the valves by pins at their ends.

In order to enable others skilled in the art to make and use my invention, I will proceed, in aid of the accompanying drawings, to describe its construction and operation.

I construct my register of metals, as others usually are, and in the usual forms. The top or surface is made open by scroll or fret work, so as to admit the passage of warm air freely, and at the same time to protect the valves, as in case of a person walking over the register, if placed in the floor.

Figure 1:
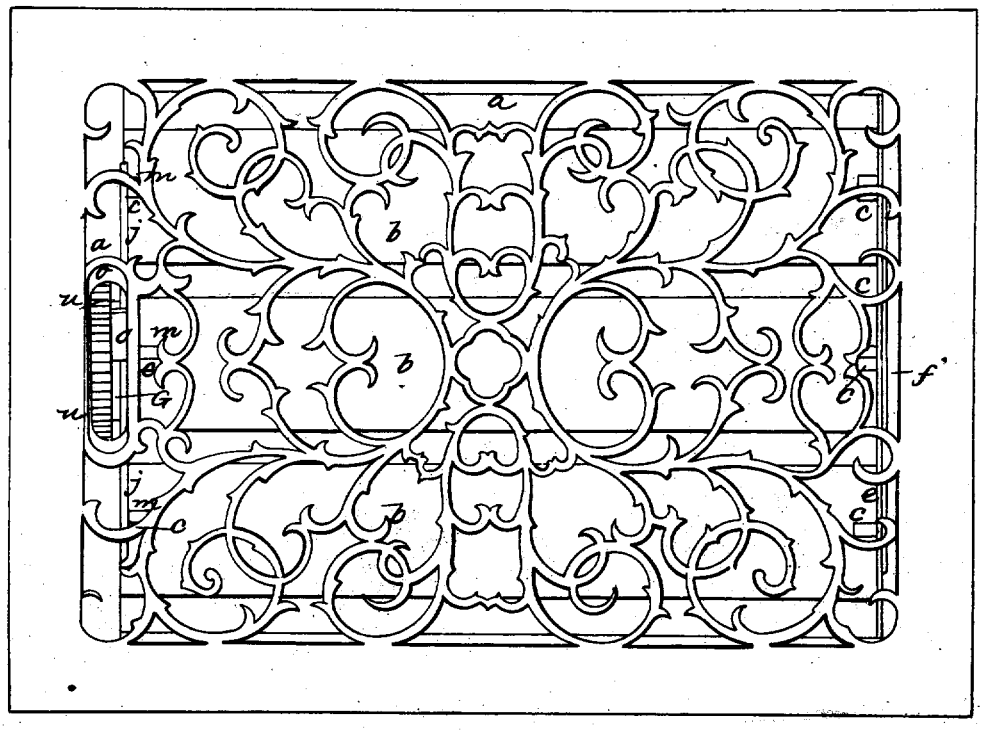
Figure 2:
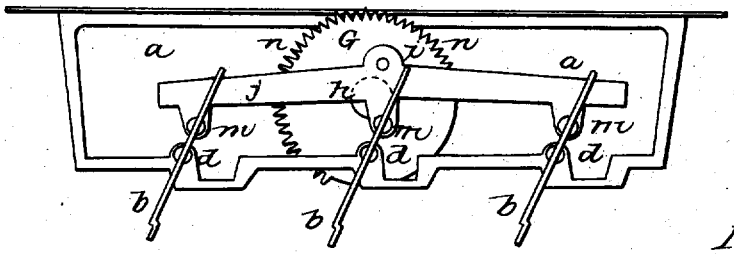
Figure 3:
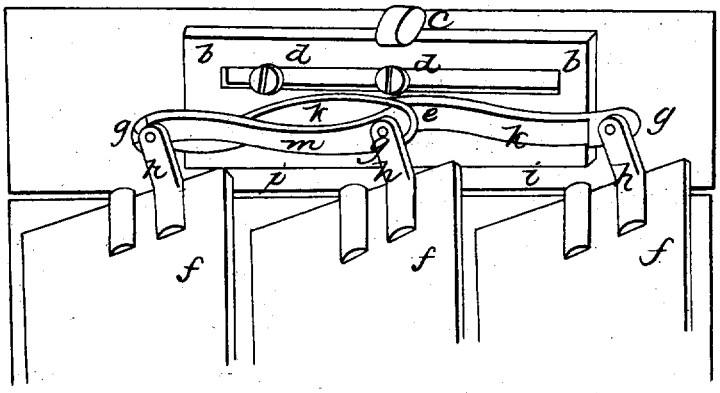
Figure 2:
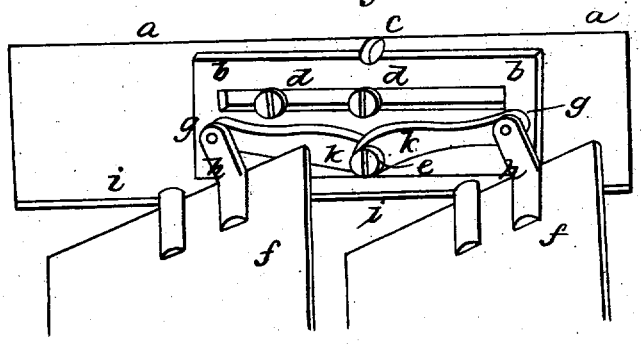

My drawings and description describe my register when constructed in a square form. The valves *b b b*, Fig. 1, three in number, (sometimes a greater or less number are used,) are suspended in the frame of the register at a sufficient depth or distance from its top or scroll-work, so that when they are open the fans or valves will not come in contact with the top of the register. The pins or axles *c c c*, upon which the valves are suspended and upon which they should turn freely, are situated at the ends of the valves, at or near their middle. One end of the valves is secured in the frame by the pins *c c c*, playing in the holes *d d d* (see Fig. 2) in the frame. The opposite ends of the valves are secured by the strip *e e*, which is secured firmly and closely over the ends of the pins *c c c* by a screw at *f*. At the end of the register, and playing freely upon its center, is the wheel G, attached to the register by the means of a screw or pin, *h*. (See Fig. 2.) This screw or pin is firmly fixed in the frame and forms the axle of the wheel. The wheel is preserved on its axle by a head on this pin or axle, which head must be flush with the surface of the wheel. Upon the wheel, situated at a distance from its center, is the pin *i*, Fig. 2. This pin must be placed horizontally with the center of the wheel when the register is closed. Upon this pin *i* is suspended the connecting-rod *j j*, shaped nearly as in the drawing Fig. 2, or in any convenient manner, and moving freely upon its axle *i*. This connecting-rod rises or falls in a circular direction when the wheel is put in motion. This connecting-rod is attached to the valves at *m m m* by pins on the ends of the valves. These pins are situated at the same distance from the centers of the axles at *d d d*, Fig. 2, that the pin *i* is from the center *h*. This is necessary in order that the register may work without binding at any stage of its opening or closing. Now, it will be perceived that when the wheel is moved for the purpose of opening the register the connecting-rod *j j* is raised with it, and also that side of the valves to which the connecting-rod is attached is raised, and consequently opened in proportion to the distance which the wheel is moved. The opposite motion cannot fail to close the valves of the register. The top of the wheel G is notched, as at *n n*, so that the foot will act upon it with more certainty. There is a recess around the wheel in the surface of the register, as at *o o o*, for the purpose of giving free access to the edge or notched surface of the wheel to turn it. The notched edge should be flush with the surface of the register.

Having thus briefly described the construction and operation of my register, I will briefly state what I believe to be new about it, and what are some of the improvements made.

I regard as new the adoption of the upright or vertical wheel, or segment of a wheel, as a moving power, together with the arrangement of the connecting-rod, which moves in a circular direction with the wheel, the said rod being attached to the valves, as previously described.

The improvements attained are (some of them) as follows: The vertical wheel or segment by its position enables persons to impart motion to it with the foot (when placed in the floor, as it more commonly is) without stooping down, thus being an improvement in point of convenience; second, the employment of the wheel and connecting-rod very greatly diminishes friction, giving it an advantage in opening with more ease than any register now in use; third, from the nature of its construction it needs no holder, key, or other device, which may or may not be at hand when needed to open the register, being an improvement in point of time in opening, and also safety from burning the fingers; fourth, my arrangement enables me to place my machinery for opening and working the register compactly in one end of the register. In this position they afford no obstruction to the free passage of warm air through it, which is very desirable.

I do not claim the wheel itself as new, or a thing by any means patentable; but

What I do claim, and desire to secure by Letters Patent, is—

The application of the upright or vertical wheel or part or segment of a wheel to the opening and closing of hot-air registers and ventilators, the edge or periphery of which is placed flush, or nearly so, with the top surface of the register, and can be acted upon by the foot, if desired, the wheel or part of a wheel so placed imparting motion to the valves through a connecting rod or rods, which are connected or attached to the wheel at a point distant from its axis and to the valves by pins at a distance from their centers of motion, the connecting rod or rods moving in a circular direction with and corresponding to the motion of the valves that are moved.

CHAS. F. TUTTLE.

Witnesses:
JOHN L. EVERITT,
DANIEL KERNEY.